(12) United States Patent
Bowles et al.

(10) Patent No.: US 7,629,077 B2
(45) Date of Patent: Dec. 8, 2009

(54) POUCH CELL CONSTRUCTION

(75) Inventors: Peter G Bowles, Gosport (GB);
Emmanuel I Eweka, Gosport (GB);
Cyril O Giwa, Gosport (GB); Andrew G Ritichie, Farnborough (GB)

(73) Assignee: Qinetiq Limited, Farnborough, Hants (GB)

( * ) Notice: Subject to any disclaimer, the term of this patent is extended or adjusted under 35 U.S.C. 154(b) by 807 days.

(21) Appl. No.: 10/786,418

(22) Filed: Feb. 26, 2004

(65) Prior Publication Data

US 2005/0191545 A1 Sep. 1, 2005

(51) Int. Cl.
*H01M 6/46* (2006.01)
*H01M 4/72* (2006.01)

(52) U.S. Cl. .................. 429/136; 429/122; 429/162; 429/231.95; 429/233

(58) Field of Classification Search .................. None
See application file for complete search history.

(56) References Cited

U.S. PATENT DOCUMENTS

| | | | |
|---|---|---|---|
| 4,761,352 | A | 8/1988 | Bakos et al. |
| 5,156,932 | A | 10/1992 | Dougherty et al. |
| 6,190,426 | B1 | 2/2001 | Thibault et al. |
| 6,287,721 | B1 | 9/2001 | Xie et al. |
| 2001/0003863 | A1 | 6/2001 | Thibault et al. |
| 2003/0031925 | A1 | 2/2003 | During |
| 2003/0162086 | A1 | 8/2003 | Longhi, Jr. et al. |
| 2003/0194604 | A1* | 10/2003 | Aamodt et al. ............ 429/128 |

FOREIGN PATENT DOCUMENTS

| | | |
|---|---|---|
| EP | 0 642 186 A1 | 3/1995 |
| GB | 2 002 949 A | 2/1979 |
| GB | 2 095 462 A | 9/1982 |
| JP | 07-085865 | 3/1995 |
| JP | 10-340740 | 12/1998 |
| JP | 2001-76732 | 3/2001 |
| WO | WO 96/07213 | 3/1996 |
| WO | WO 01/97315 A1 | 12/2001 |

OTHER PUBLICATIONS

Giwa et al, "Scale-Up of Lithium/Carbon Monofluoride Envelope Cells", Proceedings of the 39th Power Sources Conference, Jun. 2000, p. 32-35.*
Giwa et al, "Further Development of Lithium/Polycarbon Monofluoride Envelope Cells", Journal of Power Sources 96 (2001) 180-183.
Giwa et al, "Lithium Primary Envelope Cells", 16$^{th}$ International Seminar and Exhibit on Primary and Secondary Batteries, Fort Lauderdale, Florida, Mar. 1999.

* cited by examiner

*Primary Examiner*—Jonathan Crepeau
*Assistant Examiner*—Tony Chuo
(74) *Attorney, Agent, or Firm*—Nixon & Vanderhye P.C.

(57) ABSTRACT

An electrode assembly is formed by respectively overlaying a sheet cathode 1, a sheet separator 3 and a double-sided sheet anode 8 to form a stacked structure 10, and subjecting the stacked structure to multiple folds, wherein the initial fold comprises folding the cathode in half around the double-sided anode so as to surround the respective upper and lower active anode surfaces thereof. The multiple folds may comprise one or more subsequent parallel folds made with the fold line D-D extending perpendicular to the original length of the stacked structure such that its overall length is halved at each fold. A pouch battery comprising said electrode assembly has improved safety and performance characteristics. The pouch battery construction has especial application to lithium primary batteries.

2 Claims, 3 Drawing Sheets

POUCH CELL CONSTRUCTION

FIELD OF THE INVENTION

The present invention relates to pouch batteries and methods for their construction, and particularly to lithium primary batteries, such as, for example, lithium/carbon monofluoride batteries.

BACKGROUND OF THE INVENTION

So-called 'pouch' batteries, which are also known as 'envelope' or 'packet' batteries, are increasingly replacing traditional hard-cased batteries in portable electrical applications. In a typical pouch battery, the battery components are overlaid to form a laminated cell structure, folded to a required size and then packaged in a heat-sealable foil. This packaging method offers a light-weight and flexible solution to battery design, and is capable of achieving high energy densities, with the final capacity of the cell being selected according to the desired application.

Pouch batteries can be based on a variety of different cell chemistries, and a range of electrolyte types can be utilised. Lithium primary and secondary batteries, for example, are commonly made according to a pouch design, and dry polymer, gel and liquid electrolytes have all been incorporated into pouch cells.

Despite benefits of weight, size and flexibility, manufacturers are constantly striving to improve the performance of pouch batteries to meet the increasing demands of the portable electronics industry. Moreover, pouch batteries do not offer optimum conditions for battery safety, particularly when attempts are made to scale them up.

SUMMARY OF THE INVENTION

The object of the present invention is to overcome, or at least mitigate, problems associated with the prior art.

According to a first aspect of the present invention, there is provided a pouch battery comprising an electrode assembly, said assembly formed by respectively overlaying a sheet cathode, a sheet separator and a double-sided sheet anode to form a stacked structure, and subjecting the stacked structure to multiple folds, wherein the initial fold comprises folding the cathode in half around the double-sided anode so as to surround the respective upper and lower active anode surfaces thereof. The separator lies between the opposing active anode and cathode surfaces so as to prevent contact between the anode and cathode. The term "sheet" as used herein means "sheet-like", and the separator or electrodes may each be of a single or multiple layer construction, the latter preferably, but not necessarily, being bonded together to form a unitary sheet.

By employing a double-sided anode, significant improvements in energy density can be achieved, particularly where the anode comprises a single sheet current collector half the size of the cathode (as opposed to a current collector layer the same size as the other sheets, but folded in two); ideally the anode current collector's dimensions should correspond roughly to those of the cathode when folded in half perpendicular to its length. Moreover, by using a half sized anode that is active on both sides, the cathode capacity/cm² can be reduced, leading to a number of other advantages.

Usually, both the cathode and separator will be substantially the same size and shape, with the anode comprising a current collector layer that is half their size. (In some instances, the separator may be slightly larger than the cathode for safety reasons.) Usually, all three sheets will be of substantially the same width; (again, the separator may be slightly wider for safety reasons). The anode will then be laid over the upper half of the length of the other two superimposed sheets, with its bottom edge aligned with the mid-line of the other two sheets. Preferably, the aligned top edges of both anode and cathode electrode sheets have projecting contacts or tabs that act as electrode terminals.

Existing lithium batteries with a pouch cell construction normally use a spiral wound construction or a zig-zag folding method (resulting in fan folds) to reduce the size of the electrode assembly, the latter method being readily automated. However, in the present invention an alternative folding method is preferred.

During the initial fold the cathode is preferably folded midway along its length, so that the fold line extends perpendicular to the sheet length. Usually, the one or more subsequent folds is then made with the fold line extending perpendicular to the original length of the stacked structure, so that the overall length is halved at each fold and the folds are parallel to one another. (Such aligned half-folds are hereinafter generally referred to as "parallel folds".) It is desirable to make the one or more subsequent folds upon the same side of the stacked structure, so that the sheets continue to be rotated in the same direction. Advantageously, all the folds in the electrode assembly, including the initial fold, are parallel to one another.

The use of parallel folds is convenient in rapidly reducing cell size and appears to lead to improved cell performance, for example, the utilisation of cell materials appears to be better. This is believed to be due to the fact that most of the folds are less acute than in prior art folding arrangements. Other advantages of having all the folds parallel to one another include ease of electrolyte filling, and reduced resistance to subsequent folding.

To achieve different battery capacities, sheet electrodes with appropriately selected widths and lengths are employed to form the stacked structure and then at least two or three folds, up to maximum of about 5 or 6 folds, and preferably up to four folds, are made, as necessary, to reduce the electrode assembly to a convenient size and/or thickness. The present invention may be advantageously employed in larger scale pouch cells, that is, cells with nominal capacities exceeding 18 Ah, 25 Ah, 36 Ah or even 50 Ah, and also in smaller capacity pouch cells, that is, cells with nominal capacities below 18 Ah, 5 Ah, 1 Ah or even lower. In larger scale cells, electrode sheet widths will usually exceed 5 cm and lengths will exceed 1 m.

The present invention relates, in particular, to primary lithium/solid cathode cells and, especially to lithium/carbon monofluoride primary cells. Thus, the active cathode material is preferably carbon monofluoride, also known as polycarbon monofluoride, or $CF_x$. However, the invention is applicable to all possible cathode materials, such as, for example, manganese dioxide, iron disulphide, or cobalt oxide, and also to secondary, as well as primary, lithium batteries.

The cathode will normally comprise a sheet current collector and a cathode material layer, and usually the cathode will have an active surface on only one side thereof, over the entire face, formed by the cathode material layer. Ideally, the total cathode and anode capacities will be roughly matched to produce a balanced cell. (A difference in capacities of less than 15% is desirable.) If the cell is not balanced, any excess of either the anode or cathode material will not react and is dead weight. Furthermore, any unconsumed anode material remaining in the cell once the battery has been discharged may pose a safety hazard upon battery disposal, especially for larger scale pouch cells.

A double-sided anode is one which has two active surfaces, an upper active surface and a lower active surface, usually extending over the entire respective faces. The double-sided sheet anode will normally comprise a single sheet current collector and one or more anode material layers forming said upper and lower active surfaces. All the layers may be separate, but are preferably attached together or merged together or otherwise combined together to form a single integral anode. In a preferred arrangement for a lithium cell, the double-sided anode comprises a current collector in the form of a mesh or grid, usually of copper, with lithium foil occupying the openings thereof to form a double-sided lithium anode. Alternatively, the double-sided anode may be a single layer of lithium metal having upper and lower active surfaces.

The loading of the cathode material layer may be selected so that the cathode capacity/$cm^2$ is about half that of the anode capacity/$cm^2$. One advantage of having a reduced cathode capacity/$cm^2$ is that the coating thickness required for the active cathode material is less than it otherwise would be, which gives better coating adhesion, particularly in the case of carbon monofluoride. Furthermore, decreasing the cathode coating thickness leads to a beneficial increase in the power output for the battery.

In a further aspect, there is provided a method of manufacturing a pouch battery comprising the steps of:

overlaying a sheet cathode, a sheet separator and a double-sided sheet anode, respectively, to form a stacked structure;

folding the cathode in half around the double-sided anode so as to surround the respective upper and lower active surfaces thereof;

subjecting the folded sheets to one or more further folds to form an electrode assembly; and, forming a pouch battery by sealing the electrode assembly in an envelope.

The electrode assembly may be placed in a pre-formed envelope that is subsequently sealed at the edge from which the contact tabs protrude, or the pouch may be formed in situ around the electrode assembly. Where the separator needs to include a liquid electrolyte, the method will include an electrolyte filling stage, prior to the final sealing of the pouch.

The anode is double-sided, that is to say, both of its surfaces act as effective electrode surfaces. The anode will usually include a current collector. In the case of a lithium anode, although the current collector may be sandwiched between two separate pieces of lithium foil each backed on to it, or between a single folded piece of lithium foil, advantageously the anode is an integral component comprising lithium foil integrated into a mesh, preferably a copper mesh. This arrangement offers equal amounts of lithium on each side of the anode, while preserving structural integrity and current flow, regardless of the extent of breakdown of the anode.

In one Example, a lithium/Cu laminate was formed by pressing 132 micron lithium foil onto 100 micron copper mesh, such that the lithium occupied the spaces within the mesh, to give a composite structure of capacity 27.2 mAh/$cm^2$ and depth 132 micron. This laminate was then cut to the required size for the anode.

The parallel folds described above provide benefits when employed in any pouch battery constructions, including prior art batteries having an anode of substantially the same size as the cathode. Thus, in a further aspect of the present invention, there is provided a pouch battery in which cathode, separator and anode sheets have been respectively overlaid on one another to form a stacked structure, and the structure has been successively folded in half so that its length is halved at each fold, each fold being made upon the same side of the structure with the fold lines extending perpendicular to the original length.

BRIEF DESCRIPTION OF THE DRAWINGS

The invention will now be described in more detail, by way of example only, with reference to the accompanying drawings, in which.

DETAILED DISCUSSION OF PREFERRED EMBODIMENTS

Figure 1A:
FIGS. 1a and 1b are schematic elevational and plan views, respectively, of a typical prior art arrangement used to form an electrode assembly.
Figure 1B:
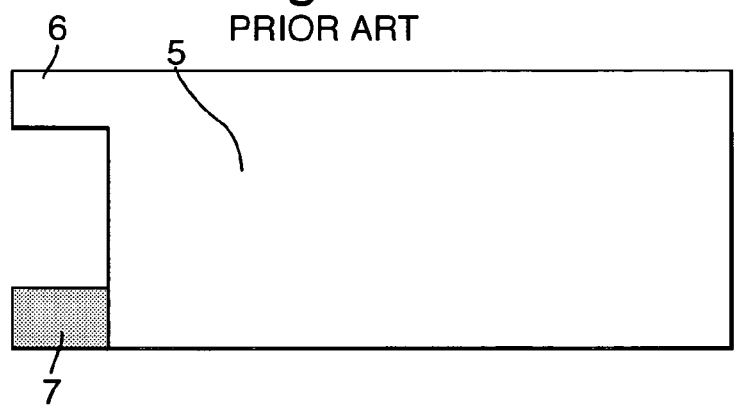

Elevational and plan views of a typical prior art arrangement used to form an electrode assembly are illustrated in FIGS. 1a and 1b respectively. The prior art assembly comprises a cathode collector layer 1, a cathode material layer 2, a separator 3, an anode material layer 4 and an anode collector layer 5, wherein each layer is substantially the same length and width. The collector layers 5 and 1 each comprise an additional tab of collector material 6 and 7 to act as respective anode and cathode terminals. The component layers are overlaid and together form a stacked structure that can be folded subsequently, if desired, to a smaller size. As indicated above, fan or zig-zag folds have commonly been used to reduce the size of prior art electrode assemblies prior to insertion into the packaging pouch.

Figure 2:
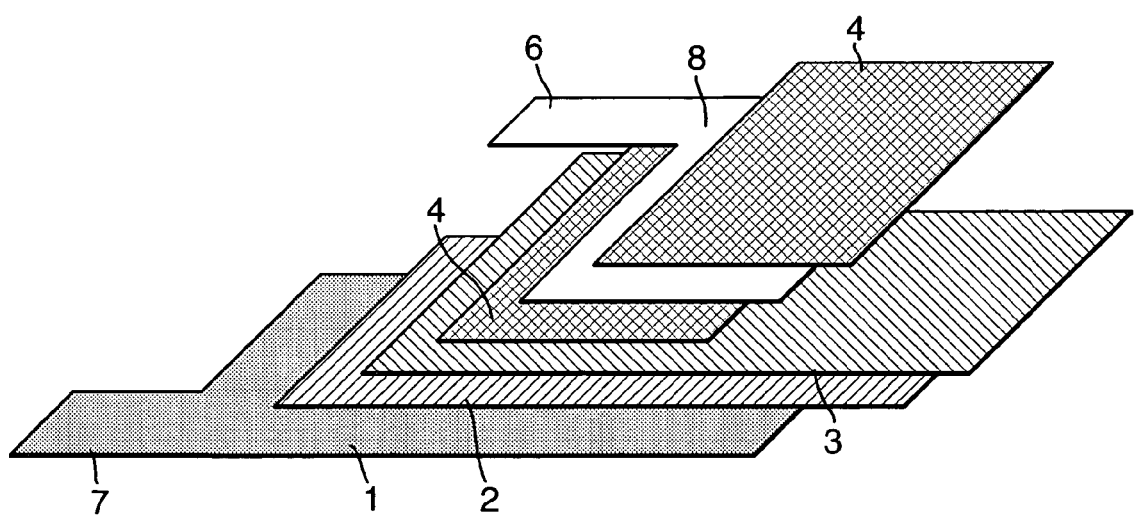
FIG. 2 is a schematic, exploded view of a stacked structure used to form an electrode assembly according to the present invention.
Figure 3A:
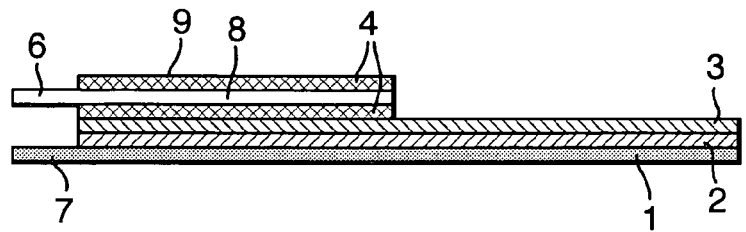
FIGS. 3a and 3b are schematic elevational and plan views, respectively, of the stacked structure, prior to the initial fold.
Figure 3B:
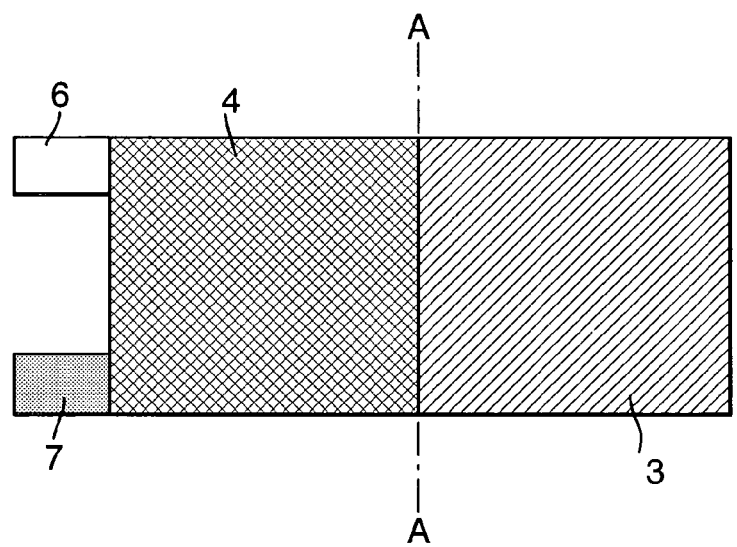

FIG. 2 is an exploded view, illustrating the components of a stacked structure used according to the present invention to form an electrode assembly for a pouch battery. FIGS. 3a and 3b show elevational and plan views, respectively, of the structure, prior to the initial folding step. The cathode collector layer 1, cathode material layer 2 and separator 3 are laid up in the same manner as in the prior art arrangement. In contrast to the prior art structure, however, a double-sided anode 9 comprising anode material layers 4 and an anode collector layer 8 is positioned such that the bottom edge of the anode is aligned with a mid-line A-A of the cathode and separator layers. The double-sided anode 9 is substantially half the length of the cathode and separator layers.

Figure 4A:
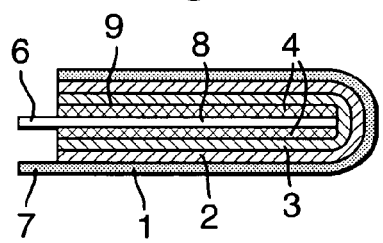
FIGS. 4a and 4b are schematic elevational and plan views, respectively, of the stacked structure after the initial fold.
Figure 4B:
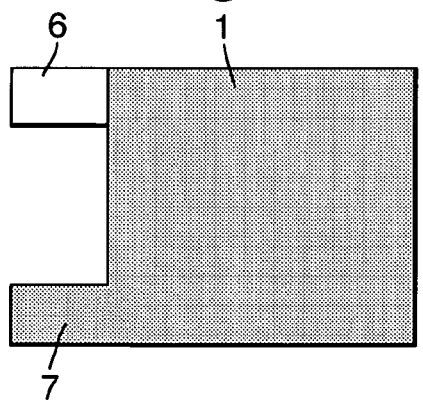

FIGS. 4a and 4b show elevational and plan views, respectively, of the stacked structure after the initial fold.

The anode collector preferably comprises a metal mesh, grid or gauze, and is used to provide the external anodic, or negative, contact to the cell. Preferably the anode collector comprises a copper mesh. The cathode collector provides the external cathodic, or positive, contact to the cell and preferably comprises aluminium foil. Other suitable collector materials are well known in the art.

The anode material layers function as the anode of the battery and preferably comprise lithium. In one preferred assembly, the anode collector and lithium together form an integral anode, wherein lithium is present on both sides of the anode collector. Ideally, the integral anode is formed by pressing lithium foil onto a mesh, most suitably a copper mesh, such that the lithium occupies the openings of the mesh.

Safety is of particular concern in the case of larger capacity pouch cells, and hence, fragmentation of lithium metal as the anode is consumed should be minimised. (Prior art pouch cells containing liquid electrolyte have been known to present a fire hazard due to free lithium coming into contact with flammable organic solvent.) By using an integral anode in which the lithium is held on a solid substrate, in this case the anode collector, the liberation of fine particles of pyrophoric lithium into the cell can be substantially prevented.

The purpose of the separator is to separate the anode from the cathode, to carry the electrolyte and to act as a safety shut-down separator should the pouch cell overheat. For certain types of electrolyte, such as a dry polymer electrolyte or a polymer gel electrolyte, the electrolyte may itself function as the separator. For other types of electrolytes, in particular for a liquid electrolyte, the separator may comprise a semi-permeable or porous membrane which is soaked with the electrolyte.

Preferably, the separator comprises a liquid electrolyte and a semi-permeable membrane. More preferably, the semi-permeable membrane is a tri-layer polymer laminate, for example a polypropylene-polyethylene-polypropylene laminate.

Suitably, the liquid electrolyte comprises an organic carbonate, such as, for example, one or more of propylene carbonate, ethylene carbonate, dimethyl carbonate, diethyl carbonate and ethyl methyl carbonate, a borate, such as, for example, lithium bis-oxalato borate and lithium tetrafluoroborate, lithium hexafluorophosphate, lithium hexafluoroarsenate, lithium perchlorate, or any mixture thereof. Conveniently, the liquid electrolyte is dispersed in an organic solvent such as, for example, dimethoxyethane.

The electrode assembly requires one or more further folds, so as to form a compact assembly of the correct size for insertion into the packaging envelope. Any suitable folding method may be used, but preferably the one or more further folds are parallel folds. It is believed that parallel folds cause less damage to the various electrode and separator materials at the folds, thereby improving cell performance.

Another benefit of the parallel folding method is associated with the electrolyte filling stage. When liquid electrolyte is used, the electrolyte is preferably injected into a semi-permeable separator membrane after the precursor electrode assembly has been folded ready for insertion into the envelope packaging. More preferably, the liquid electrolyte is injected after the precursor electrode assembly has been inserted into the envelope packaging. In either case, the electrolyte needs to permeate the entire length of the separator membrane so as to yield an efficient cell. The inventors have found that parallel folds aid this process, leading to more rapid and more complete permeation than for a fan folded assembly. This may be due to less severe folds, but this is merely a theory.

Figure 5:
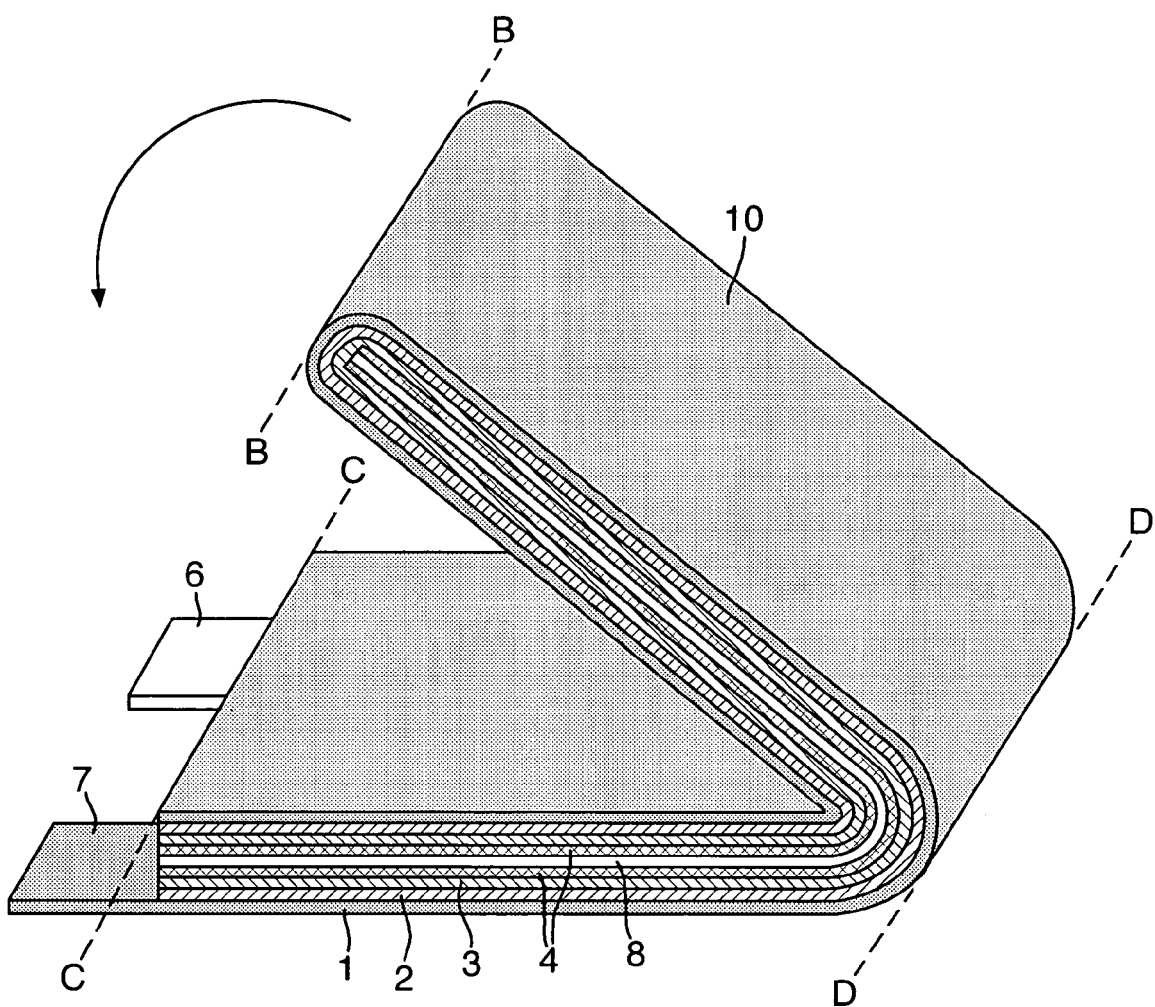
FIG. 5 schematically illustrates the stacked structure after a subsequent "parallel fold".

FIG. 5 illustrates the parallel folding process. A parallel fold brings the lower edge of the stacked structure 10, indicated as edge B-B in FIG. 5, up to, and parallel with, the upper edge of the stacked structure, indicated as edge C-C in FIG. 5, in the direction indicated by the arrow. Contact tabs 6 and 7 are left exposed. The fold line, indicated as D-D in FIG. 5, is therefore the mid-point of the unfolded stacked structure. For the next parallel fold, the fold edge D-D becomes the lower edge of the stacked structure, and so on. Successive parallel folds are preferably made on the same side of the stacked structure, (that is, folding continues in the direction of the arrow), which leads to less overall stress on its components.

Preferably, up to 5 or 6 folds are required in total. More preferably, up to 4 folds are required.

Typically, the packaging envelope comprises a foil layer, for example Surlyn®, which is folded to the required dimensions and heat sealed, either prior to insertion of the electrode assembly or in situ during construction of the electrode assembly. If an electrolyte-filling step is required, the edge bearing the contact tabs is sealed after said filling step.

For many cathode materials of choice, such as manganese dioxide and carbon monofluoride, the cathode material is coated onto the cathode collector as a slurry prior to assembling the precursor electrode assembly, thus forming an integral cathode. Preferably, the anode collector and lithium layer also form an integral electrode. By using at least one integral electrode, cell construction is simplified, and lay-up errors reduced. If both anode and cathode are integral electrodes, only three components need be laid down; the cathode, the separator and the half-length anode.

EXAMPLE

The following Example illustrates the invention:

A 25 Ah primary lithium carbon monofluoride cell was manufactured in the following way:

A cathode sheet was prepared by, first, grinding and mixing intimately 42 g carbon monofluoride and 3.2 g of conductivity additive (carbon black). A binder solution was prepared by dissolving 4.8 g of polyvinylidene fluoride (PVDF) in N-methyl pyrollidinone. Then a paste was formed from the $CF_x$ mixture and the PVDF solution.

Aluminium foil (1050 Alloy, 25-30 micron) was cleaned and the cathode paste was coated onto the Al foil to a depth of 570 micron, so as to give a cathode capacity of 12.6 to 13.6 mAh/cm$^2$. The sheet was then dried to give a final cathode composition by weight of 84:9.6:6.4 w/o $CF_x$:PVDF:conductivity additive, and a final coating thickness of 185 micron.

The cathode sheet was cut to a length of 208 cm and a width of 9 cm, leaving an extra length for the terminal. The sheets were folded in half and vacuum dried, and, after drying, the cathode sheets were rolled and the cathode electrical terminals were prepared.

Next, the anode was prepared using a laminate formed from copper mesh and a single layer of lithium foil, the latter attached from one side of the mesh. The laminate was cut to a length of 104 cm and a width of 9 cm, leaving an extra length for the terminal, and then the laminate sheet was rolled. The thickness of the copper mesh was 100 micron and the lithium foil thickness was 132 micron, giving an anode capacity of 27.2 mAh/cm$^2$.

The anode electrical terminal was prepared by removing lithium from a defined area of the anode laminate with a suitable solvent. The lithium anode was then dried under vacuum to remove traces of solvent.

A safety separator (Celgard) was dried overnight under vacuum and then cut to a length of 209.5 cm and a width of 10.5 cm.

A Surlyn® sheet was cut and trimmed to the correct dimensions to form the cell packaging, and then heat sealed.

The cell was fabricated by first assembling the cathode-separator-anode layers. The cathode and separator layers were then folded around the anode, by means of a single parallel fold, to give a stacked structure of width 9 cm and length 104 cm. Then, three more parallel folds were applied to give a precursor electrode assembly of length 13 cm and width 9 cm, and the folded electrode assembly was inserted into the Surlyn® bag.

70.2 g of lithium tetrafluoroborate was dissolved in a mixture of anhydrous propylene carbonate and anhydrous dimethoxyethane, to give a 1M solution of $LiBF_4$ electrolyte. The electrolyte was injected into the cell and then the cell was sealed.

Upon testing, the achieved capacity was 24.3 Ah, the cell utilisation was 95% and the energy density was 500 Wh/kg.

The invention claimed is:

1. A pouch battery comprising an electrode assembly, said assembly formed by respectively overlaying a sheet cathode, a sheet seprator and a double-sided sheet anode to form a stacked structure, and subjecting the stacked structure to multiple folds, wherein the initial fold comprises folding the cathode in half around the double-sided anode so as to surround the respective upper and lower active anode surfaces thereof, and wherein one or more subsequent folds is made with the fold line extending perpendicular to the original length of the stacked structure and its overall length is halved at each fold,
   in which the double-sided anode comprises a single sheet current collector and one or more anode material layers forming said upper and lower active surfaces, wherein said layers have been attached together or merged together or otherwise combined together to form a single integral anode, and
   in which the double-sided anode comprises a current collector in the form of a mesh or grid with lithium foil occupying the openings thereof to form a double-sided lithium anode.

2. A primary lithium/solid cathode pouch battery comprising an electrode assembly formed by respectively overlaying a sheet cathode, a sheet separator and a double-sided sheet anode to form a stacked structure, and subjecting the stacked structure to multiple folds, wherein the initial fold comprises folding the cathode in half around the double-sided anode so as to surround the respective upper and lower active anode surfaces thereof, and wherein one or more successive folds comprises folding the stacked structure so its overall length is halved with each fold, the fold lines being made perpendicular to that length, and wherein the double-sided anode comprises a current collector in the form of a mesh or grid with lithium foil occupying the openings thereof to form a double-sided lithium anode.

* * * * *